United States Patent
Devenyi

(10) Patent No.: US 6,819,510 B1
(45) Date of Patent: Nov. 16, 2004

(54) MECHANICAL DEVICE HAVING CYLINDRICAL COMPONENTS LOCKED TOGETHER BY A RETAINER HAVING AN ORGANIC PLASTIC RETAINER OUTER SURFACE

(75) Inventor: Gabor Devenyi, Penetanguishene (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/464,317

(22) Filed: Jun. 18, 2003

(51) Int. Cl.[7] .............................. G02B 7/02; G02B 15/14
(52) U.S. Cl. ...................... 359/826; 359/819; 359/820; 359/823; 359/830; 359/704
(58) Field of Search ............................... 359/819, 820, 359/823, 826, 829, 825, 830, 694, 695, 704

(56) References Cited

U.S. PATENT DOCUMENTS

| | | | |
|---|---|---|---|
| 2,319,063 A | | 5/1943 | Hutchison, Jr. .............. 396/144 |
| 3,827,814 A | | 8/1974 | Laurent et al. .............. 403/301 |
| 4,302,076 A | | 11/1981 | Hashimoto ................... 359/830 |
| 4,640,579 A | * | 2/1987 | Takizawa ..................... 359/826 |
| 4,740,065 A | | 4/1988 | Aoyagi ........................ 359/704 |
| 5,381,272 A | * | 1/1995 | Kato et al. ................... 359/823 |
| 5,392,160 A | * | 2/1995 | Satoh et al. ................. 359/695 |
| 5,398,498 A | | 3/1995 | Mort et al. ..................... 60/223 |
| 5,940,228 A | | 8/1999 | Burnett ........................ 359/825 |
| 6,266,183 B1 | * | 7/2001 | Guenther et al. ........... 359/383 |
| 6,288,855 B1 | | 9/2001 | Devenyi ...................... 359/830 |
| 6,337,775 B1 | * | 1/2002 | Wilson ........................ 359/819 |

* cited by examiner

Primary Examiner—Loha Ben
(74) Attorney, Agent, or Firm—William C. Schubert; Karl A. Vick

(57) ABSTRACT

A mechanical device includes a female component having a right-circular cylindrical internal surface and a cylindrical axis, and a first helical recess in the internal surface of the female component. A male component having a right-circular cylindrical external surface is sized to be slidably received within the right-circular cylindrical internal surface of the female component and has a second helical recess in its external surface. The second helical recess has a helical pitch which is the same as that of the first helical recess, so that the second helical recess is in facing relationship along its length to the first helical recess when the male component is assembled to the female component. A retainer is received within the first helical recess and the facing second helical recess when the male component is assembled to the female component. The retainer has an organic plastic retainer outer surface, preferably a polytetrafluoroethylene retainer outer surface.

20 Claims, 3 Drawing Sheets

MECHANICAL DEVICE HAVING CYLINDRICAL COMPONENTS LOCKED TOGETHER BY A RETAINER HAVING AN ORGANIC PLASTIC RETAINER OUTER SURFACE

This invention relates to the interlocking of mechanical components and, more particularly, to the interlocking of a male cylindrical component and a female cylindrical component to allow cylindrical rotation therebetween, with or without relative axial movement.

BACKGROUND OF THE INVENTION

A number of types of mechanical devices include components that translate relative to each other while maintaining a precisely defined, axially aligned relationship. In an example of interest, an optical zoom lens requires that tubular housings containing the optical elements rotate relative to each other about, and simultaneously translate parallel to, a central optical axis to change the spacings of the optical elements. In other applications, the two tubular housings rotate about the optical axis but do not translate relative to each other along the optical axis. In each case, the housings rotate about the optical axis, but must remain well-aligned along the optical axis so that the optical signal is not distorted.

In such devices, the two components are interlocked together in a manner that produces and allows the required relative mechanical movement. The interlocking element may be, for example, a thread or a projection on one cylindrical component that is received in a helical groove on the other cylindrical component. In another approach, such as that described in U.S. Pat. No. 6,288,855, a spring component locks the two cylindrical components together in a manner that allows the required relative movement while producing a preload that prevents play between the cylindrical components and backlash when the direction of relative rotational movement is reversed.

The approach of the '855 patent provides a substantial improvement over the thread or projection interlock. In the work leading to the present approach, the inventor has recognized that in any of these interlock structures problems remain for some applications. The interlock structures require the use of a flowable lubricant such as an oil or grease between the two components so that they move smoothly relative to each other. The lubricant may be messy to work with, and may inadvertently produce contamination of the elements of the mechanical structure, as for example by producing a coating on lenses that interferes with their optical performance. The lubricant may degrade over time in service. For mechanical devices that are used in a vacuum, the lubricant may outgas.

Consequently, there is a need for an approach that achieves the preloading advantages of the '855 patent but does not require the use of flowable lubricants between cylindrical components. The present invention fulfills this need, and further provides related advantages.

SUMMARY OF THE INVENTION

The present invention provides a structure and a method for its preparation. The structure includes two cylindrical components that fit together, one inside the other. A locking arrangement permits the two components to rotate cylindrically relative to each other and also to move axially with respect to each other as needed. The two cylindrical components are preloaded, so that there is no play between the cylindrical components or backlash upon reversing the relative movement of the cylindrical components. The preload and avoidance of play and backlash are achieved over a wide temperature range without binding of the cylindrical components. This approach may be used with very thin-walled cylindrical components. The locking arrangement may be made to preload the cylindrical components in the axial direction. No flowable lubricant is used between the cylindrical components, yet the starting friction and continuing-movement friction between the cylindrical components is small. The locking arrangement is inexpensive to fabricate and does not require any precision parts or machining.

In accordance with the invention, a mechanical device comprises a female component having a right-circular cylindrical internal surface and a cylindrical axis, and a first helical recess in the internal surface of the female component. A male component has a right-circular cylindrical external surface sized to be slidably received within the right-circular cylindrical internal surface of the female component, with a second helical recess in the external surface of the male component. The second helical recess has a helical pitch which is the same as that of the first helical recess, so that the second helical recess is in facing relationship along its length to the first helical recess when the male component is assembled to the female component. A retainer is received within the first helical recess and the facing second helical recess when the male component is assembled to the female component. The retainer has an organic plastic retainer outer surface. The organic plastic retainer outer surface is preferably polytetrafluoroethylene, commercially available as Teflon™ polymer.

The helical pitch of the two helical recesses may be zero, in which case the two components rotate relative to each other but do not axially translate relative to each other. The helical pitch of the two helical recesses may be greater than zero, in which case the two components rotate relative to each other and axially translate relative to each other.

In a preferred application, at least one of the female component and the male component supports an optical lens. In any application, the cylindrical components may be made of the same materials or different materials. For example, the female component may be made of a female-component plastic, and the male component may be made of a male-component metal.

The retainer may be of any operable physical form. In one embodiment, the retainer is a solid piece of a retainer material having the organic plastic retainer outer surface. In another embodiment, the retainer is an annular piece of a retainer material having the organic plastic retainer outer surface. The central cavity of the annular retainer may be a metallic filler wire, such as a solid filler wire or, more preferably, a multistrand filler wire.

Desirably, the female component has an internal-surface cylindrical diameter of the internal surface that is greater than an external-surface cylindrical diameter of the external surface of the male component by a clearance of from about 0.03 to about 0.05 millimeters. The first helical recess may have a shape of a first groove having converging sides, and the second helical recess may have a shape of a second groove having converging sides. There may be a stop limiting the extent of rotation of the male component with respect to the female component. It is preferred that there be no flowable lubricant between the female component and the male component.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
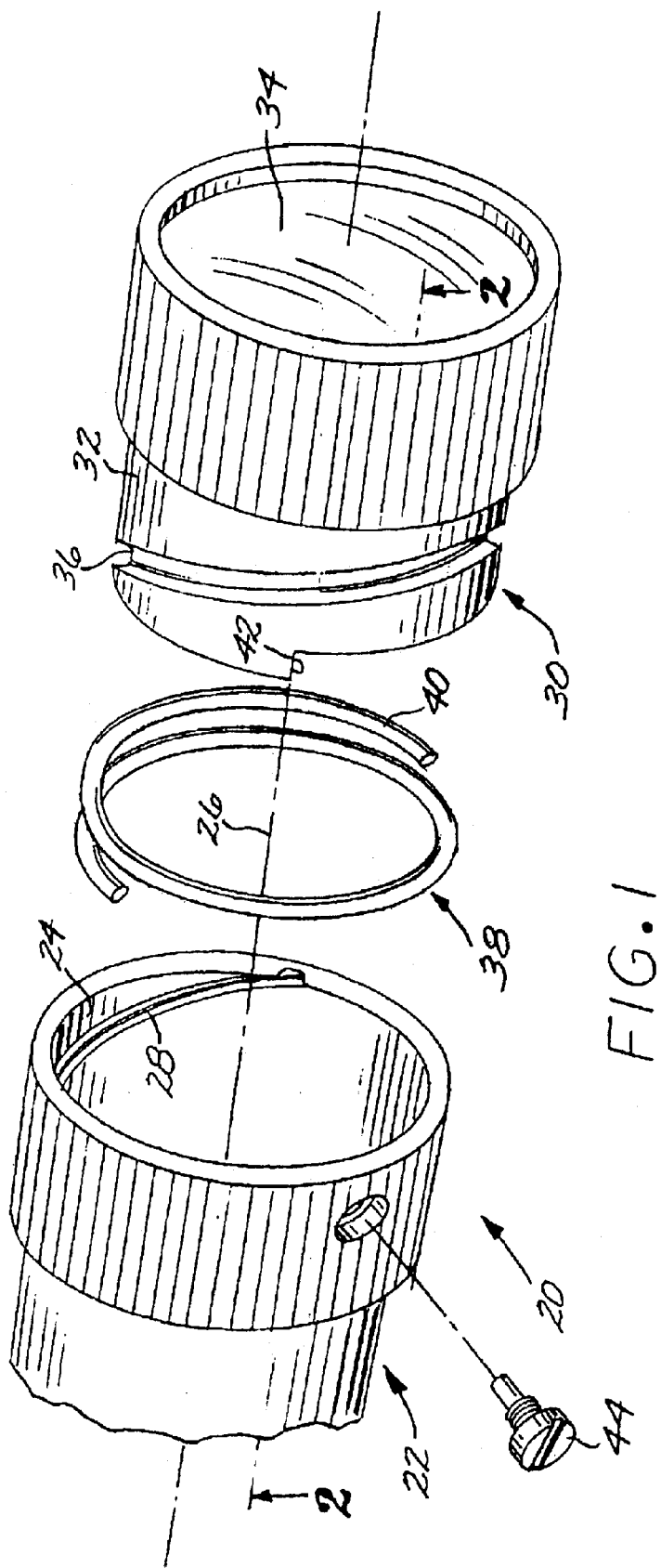
FIG. 1 is an exploded perspective view of a mechanical device in accordance with the present approach.
Figure 2:
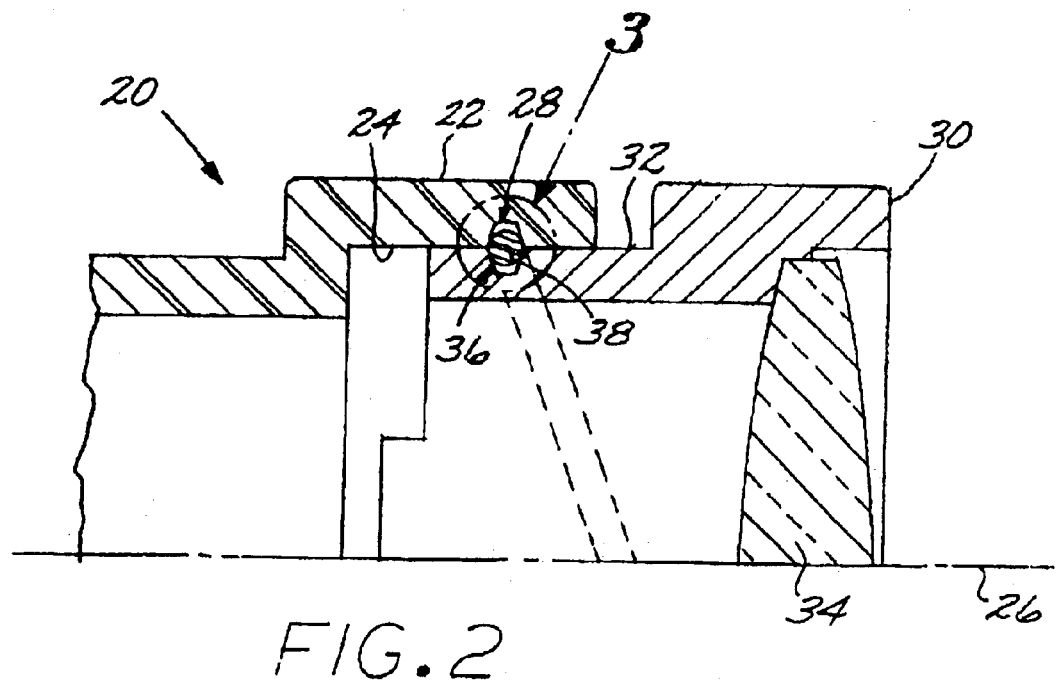
FIG. 2 is a partial sectional view of the device of FIG. 1 after assembly, taken through the cylindrical axis of the device.
Figure 3:
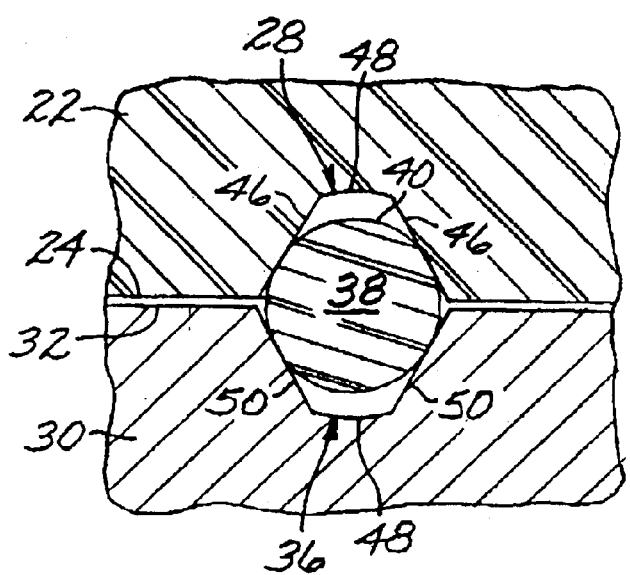
FIG. 3 is an enlarged detail of region 3—3 in FIG. 2, illustrating the recess structures and retainer placement for a nonzero helical pitch.

FIGS. 1–3 depicts the preferred application of the invention in a mechanical device 20, illustrated as a zoom lens, although the invention may be utilized in other mechanical devices well. The mechanical device 20 includes a female component 22 having a right-circular cylindrical internal surface 24 and a cylindrical axis 26. In this case, the female component 22 is a lens housing, preferably made of a female-component plastic. The female component 22 has a first helical recess 28 machined, molded, or otherwise formed into the internal surface 24.

The mechanical device 20 further includes a male component 30 having a right-circular cylindrical external surface 32. In this case, the male component 30 is a focusing mount, preferably made of a male-component metal such as an aluminum alloy, in which is supported an optical lens 34. The external surface 32 is sized to be slidably received with a smooth movement within the right-circular cylindrical internal surface 24 of the female component 22, so that the lens 34 lies on the cylindrical axis 26. Preferably, the internal surface 24 of the female component 22 has an internal-surface cylindrical diameter that is greater than an external-surface cylindrical diameter of the external surface 32 of the male component 30 by a clearance of from about 0.03 to about 0.05 millimeters.

The external surface 32 of the male component 30 includes a second helical recess 36. The second helical recess 36 has the same helical pitch as the first helical recess 28, so that the second helical recess 36 is in facing relationship at all locations along its length to the first helical recess 28 when the male component 30 is assembled to the female component 22. The helical pitch is the axial advance of the recess with each cylindrical turn or revolution about the cylindrical axis 26. The second helical recess 36 need not be of the same cross-sectional shape as the first helical recess 28, although for convenience they are typically made the same.

A retainer 38 is received within the first helical recess 28 and the facing second helical recess 36 when the male component 30 is assembled to the female component 22. The retainer 38 is a piece of retainer material that is elongated along a retainer axis that may initially be straight or curved when the retainer 38 is manufactured, but is helically curved to follow the helical recesses 28 and 36 upon assembly of the mechanical device 20. The retainer 38 preferably extends at least about 360 degrees around the circumference of the male component 30 in the embodiment of FIG. 1, so that it supports the male component 30 around its circumference. However, the retainer 38 is at least partially operable if it extends less than 360 degrees around the circumference, but preferably not less than about 270 degrees. The illustrated retainer 38 of FIG. 1 is readily prepared as a length of retainer material, which extends more than 360 degrees around the circumference when assembled into the recesses 28 and 36, and is fully functional to support and center the male component 30 within the female component 22, so that the male component 30 rides on the retainer 38 as the male component 30 is rotated about the cylindrical axis 26. This form of the retainer 38 is readily assembled to the female component 22 and the male component 30.

The retainer 38 has an outer surface 40 that is made of a solid organic plastic retainer material. The organic plastic retainer outer surface 40 and the retainer material are preferably solid polytetrafluoroethylene, available commercially under the trademark Teflon™. Many unmodified and modified forms of solid polytetrafluoroethylene are available commercially.

When inserted into the recesses 28 and 36, the retainer 38 compresses and creates a compressive force against the female component 22 and the male component 30. This desirable compressive force centers the male component 30 within the female component 22, and reduces play and backlash between the components 22 and 30. The compressive force results in a frictional force that must overcome when the male component 30 is rotated about the axis 26 with respect to the female component 22. Consequently, the coefficient of friction between the retainer 38 and the portions of the components 22 and 30 that it contacts, specifically the material of the recesses 28 and 36, is a key consideration. The coefficient of friction between the outer surface 40 of the retainer 38 and the material of at least one of the recess 28 and the recess 36 (which is normally the same material as the remainder of the respective surfaces 24 and 32) is preferably less than about 0.45, and more preferably less than about 0.1. Desirably, the coefficients of friction between the outer surface 40 of the retainer 38 and the materials of both the recess 28 and the recess 36 are preferably less than about 0.45, and most preferably less than about 0.1. If the coefficient of friction of the outer surface 40 with at least one of the materials of the recess 28 or the recess 36 is greater than these values, the present approach may be operable, but is substantially less advantageous. The coefficient of friction of the preferred material of the retainer 38, polytetrafluoroethylene, against steel is about 0.04.

The solid organic plastics such as solid polytetrafluoroethylene have a smooth, low-friction surface, so that the outer surface 40 of the retainer 38 supports the first helical recess 28 in the internal surface 24 of the female component 22 and the second helical recess 36 in the external surface 32 of the male component 30 relative to each other with a low-friction surface. This support of the components 22 and 30 by the low-friction outer surface 40 eliminates the need for a flowable lubricant between the surfaces 24 and 32. In the preferred embodiment, no such flowable lubricant is present. The elimination of the flowable lubricant required in prior approaches reduces the messiness encountered during the assembly of the components 22 and 30 when a flowable lubricant is used. Additionally, the flowable lubricant may be subject to degradation over time, and in particular environments such as a vacuum due to vaporization of the flowable lubricant or some of its components. There is also a reduced temperature dependence of the lubricity between the surfaces 24 and 32. The use of the low-friction outer surface 40 of the retainer also has the important benefit of reducing the coefficient of friction associated with the contact between the retainer and the components 22 and 30, as compared with the use of a retainer in which the surface is metallic.

Figure 5:
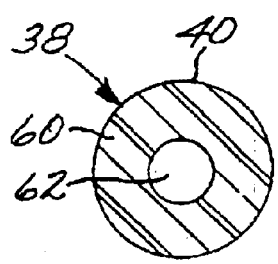
FIG. 5 is a sectional view of a second embodiment of the retainer.
Figure 6:
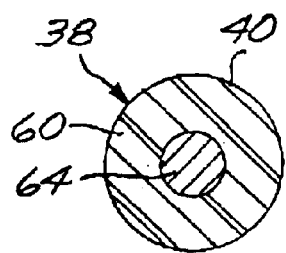
FIG. 6 is a sectional view of a third embodiment of the retainer.
Figure 7:
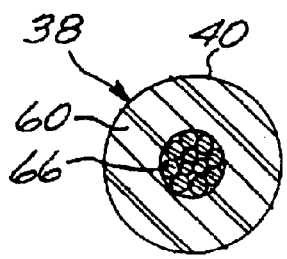
FIG. 7 is a sectional view of a fourth embodiment of the retainer.

The elongated retainer 38 may be of any operable cross-sectional structures. FIGS. 3 and 5–7 illustrate some preferred operable cross-sectional structures, as seen when the retainer 28 is sectioned perpendicular to its axis of elongation, but the approach is not limited to these preferred cross-sectional types. FIG. 3 illustrates the retainer 38 which is an elongated solid piece of the retainer material having the organic plastic retainer outer surface 40. FIG. 5 illustrates the retainer 38 formed of an annulus 60 of the organic plastic retainer material, where the annulus 60 has an unfilled, hollow central internal volume 62. FIG. 6 illustrates the retainer 38 formed of an annulus 60 of the organic plastic retainer material, where the annulus 60 has the central internal volume 62 that is filled with a solid metallic filler wire 64 that extends along the length of the retainer 38. FIG. 7 illustrates the retainer 38 formed of an annulus 60 of the organic plastic retainer material, where the annulus 60 has the central internal volume 62 that is filled with a stranded metallic filler wire 66 formed of a plurality of individual metallic strands of wire that extend along the length of the retainer 38 and provide added flexibility as compared with the solid metallic filler wire 64 of FIG. 6. The filler wires 64 or 66, where present, may be made of any metallic material, with spring steel or music wire having a circular cross-sectional shape being preferred. These embodiments of FIGS. 3 and 5–7 offer varying degrees of compliance and structural rigidity of the retainer 38, and may be selected according to the needs of a particular mechanical device 20.

The retainer 38 is operable with or without intentional shape distortions (e.g., small wire bends) therein along the length of the retainer. The compliant nature of the retain material used in the retainer 38 allows the retainer 38 to radially compress in the manner of a spring. Consequently, the deformation of the retainer 38 accomplishes substantially the same result as an intentional shape distortion along the length of the retainer. That is, the compliant retainer material of the retainer 38 provides a preload against the recesses 28 and 36, and thence a preload between the components 22 and 30, which reduces (and desirably eliminates) play between the components 22 and 30 and also reduces (and desirably eliminates) backlash between the components 22 and 30 when the direction of rotation of the two components relative to each other is reversed.

The mechanical device 20 is optionally provided with a stop which limits the extent of rotation about the cylindrical axis 26 and linear travel along the cylindrical axis 26 of the male component 30 with respect to the female component 22. In an illustrated preferred form, the stop includes a notch 42 in the male component 30, and a stop screw 44 in the female component 22 positioned to engage the notch 42 when the male component 30 is rotated to a maximum permitted rotation. During assembly, the stop screw 44 is backed out to permit insertion of the retainer 38 and assembly of the male component 30 to the female component 22, and thereafter screwed in so that it engages the notch 42 when the male component 30 reaches the maximum permitted rotation. In the absence of a stop, the male component 30 is permitted to rotate and translate along the cylindrical axis 26 without limit except for the extent of the lengths of the recesses 28 and 36.

The recesses 28 and 36 are preferably both grooved in form, as illustrated in FIG. 3. The sides 46 of the first helical recess 28 preferably converge at an included angle of about 60 degrees with increasing distance from the internal surface 24 so as to receive the retainer 38 against the sides 46. The first helical recess 28 may have a flat bottom 48, may be radiused in the manner of a standard thread-cut profile (as illustrated), or may have any other shape that is convenient and does not interfere with the operation of the retainer 38. Similarly, the sides 50 of the second helical recess 36 preferably converge at an included angle of about 60 degrees with increasing distance from the external surface 32 so as to receive the retainer 38 against the sides 50. The second helical recess 36 may have a flat bottom 52, may be radiused in the manner of a standard thread-cut profile (as illustrated), or may have any other shape that is convenient and does not interfere with the operation of the retainer 38.

Figure 4:
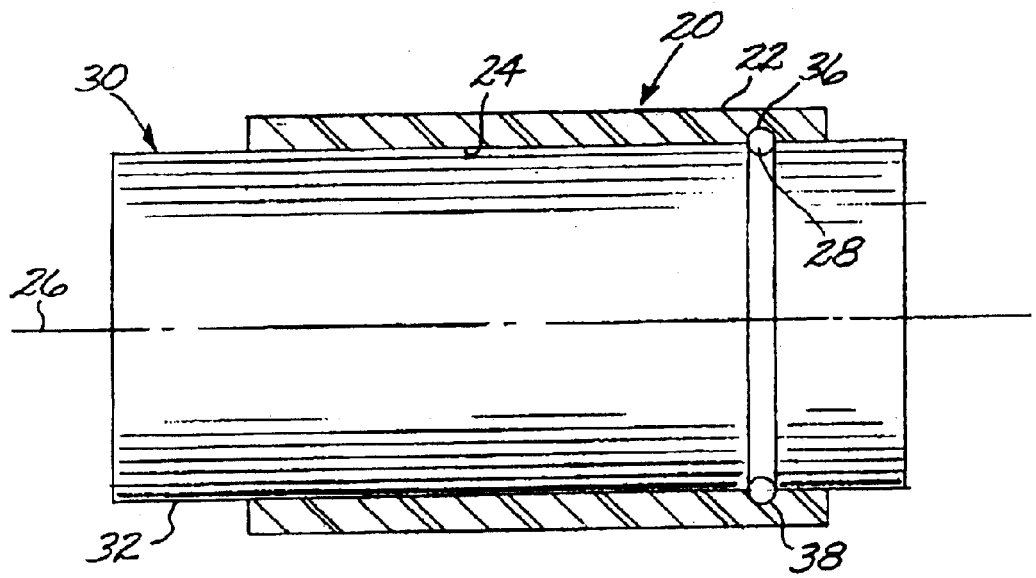
FIG. 4 is an enlarged detail of region 3—3 in FIG. 2, illustrating the recess structures and retainer placement for a zero helical pitch.

In the preferred embodiment of FIG. 1, the helical pitch is greater than zero, so that the two components 22 and 30 rotate relative to each other about the cylindrical axis 26 and also translate relative to each other along the cylindrical axis 26 as the rotation about the cylindrical axis 26 occurs. In the embodiment of FIG. 4, the helical pitch is zero, so that the two components 22 and 30 rotate relative to each other about the cylindrical axis 26, but do not translate relative to each other along the cylindrical axis 26 as the relative rotation about the cylindrical axis 26 occurs. Compatible features discussed herein are operable with the embodiment of FIG. 4, and that discussion is incorporated here.

With the aid of the compliance of the retainer material, the retainer 38 presses against the sides 46 and 50 of the respective recesses 28 and 36 to form an engagement between the female component 22 and the male component 30 that is largely free of play and backlash. This arrangement allows the helical recesses 28 and 36 to be machined or otherwise formed into the respective female component 22 and male component 30 with loose tolerances and without the need for high precision, an important engineering and manufacturing advantage. The internal surface 24 and the external surface 32 may be machined with a high degree of precision so that there is a good alignment of the male component 30 and the female component 22 for optical purposes, and there are smooth rotational and axial movements of the male component 30 relative to the female component 22. However, the precision machining of cylindrical surfaces is easier and less expensive than the precision machining of helical recesses. The surfaces 24 and 32 may instead be machined with a lesser precision, but even in that case the retainer 38 centers the male component 30 relative to the female component 32 with the result that reasonably good axial alignment is maintained.

The use of the retainer 38 also provides temperature compensation for the rotational and axial movements of the male component 30 and the female component 22. When two cylindrical components are engaged to each other with a positive thread on one component and a recess on the other component, the conventional prior configuration, there may be binding of the threads when the temperature is changed as a result of thermal expansion, particularly in those situations where the components are not made of the same material and have different coefficients of thermal expansion. In the present case, the use of two recesses 28 and 36 and the retainer 38 engagement, rather than a positive thread and a recess, allows the deformation of the retainer 38 to accommodate the relative changes in dimension of the components 22 and 30 associated with the change in temperature. The result is a movement that does not bind when the temperature changes, an important advantage. The greater the permitted tolerances, the less costly is the manufacture of the components and the wider the range of materials that may be used in the components.

The present invention has been reduced to practice for a mechanical device as shown in FIG. 1, using various retainer materials including the preferred polytetrafluoroethylene, nylon, and other plastics. It has been found to be fully functional as described, with the best performance achieved using the polytetrafluoroethylene retainer material.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A mechanical device comprising
   a female component having a right-circular cylindrical internal surface and a cylindrical axis;
   a first helical recess in the internal surface of the female component;
   a male component having a right-circular cylindrical external surface sized to be slidably received within the right-circular cylindrical internal surface of the female component;
   a second helical recess in the external surface of the male component, the second helical recess having a helical pitch which is the same as that of the first helical recess, so that the second helical recess is in facing relationship along its length to the first helical recess when the male component is assembled to the female component; and
   a retainer received within the first helical recess and the facing second helical recess when the male component is assembled to the female component, wherein the retainer has an organic plastic retainer outer surface.

2. The mechanical device of claim 1, wherein a coefficient of friction between the retainer outer surface and a material of at least one of the first helical recess and the second helical recess is less than about 0.45.

3. The mechanical device of claim 1, wherein a coefficient of friction between the retainer outer surface and a material of at least one of the first helical recess and the second helical recess is less than about 0.1.

4. The mechanical device of claim 1, wherein the organic plastic retainer outer surface is polytetrafluoroethylene.

5. The mechanical device of claim 1, wherein the retainer comprises
   solid piece of a retainer material having the organic plastic retainer outer surface.

6. The mechanical device of claim 1, wherein the retainer comprises
   an annular piece of a retainer material having the organic plastic retainer outer surface.

7. The mechanical device of claim 1, wherein the retainer comprises
   an annular piece of a retainer material having the organic plastic retainer outer surface and a central cavity, and
   a metallic filler wire within the central cavity.

8. The mechanical device of claim 1, wherein the retainer comprises
   an annular piece of a retainer material having the organic plastic retainer outer surface and a central cavity, and
   a metallic filler wire within the central cavity, wherein the metallic filler wire is a multistrand filler wire.

9. The mechanical device of claim 1, wherein a helical pitch of the first helical recess is greater than zero.

10. The mechanical device of claim 1, wherein a helical pitch of the first helical recess is zero.

11. The mechanical device of claim 1, wherein the female component is made of a female-component plastic, and the male component is made of a male-component metal.

12. The mechanical device of claim 1, wherein at least one of the female component and the male component supports an optical lens.

13. The mechanical device of claim 1, wherein the female component has an internal-surface cylindrical diameter of the internal surface that is greater than an external-surface cylindrical diameter of the external surface of the male component by a clearance of from about 0.03 to about 0.05 millimeters.

14. The mechanical device of claim 1, wherein there is no flowable lubricant between the female component and the male component.

15. A mechanical device comprising
   a female component having a right-circular cylindrical internal surface and a cylindrical axis, wherein the female component is made of a female-component plastic;
   a first helical groove in the internal surface of the female component, the first helical groove having converging sides;
   a male component having a right-circular cylindrical external surface sized to be slidably received within the right-circular cylindrical internal surface of the female component, wherein the male component is made of a male-component metal, and wherein at least one of the female component and the male component supports an optical lens;
   a second helical groove in the external surface of the male component, the second helical groove having converging sides, the second helical groove having the same helical pitch as the first helical groove so that the second helical groove is in facing relationship along its length to the first helical groove when the male component is assembled to the female component; and
   a retainer received within the first helical recess and the facing second helical recess when the male component is assembled to the female component, wherein the retainer has a polytetrafluoroethylene retainer outer surface.

16. The mechanical device of claim 15, wherein the retainer comprises
   a solid piece of a retainer material having the polytetrafluoroethylene retainer outer surface.

17. The mechanical device of claim 15, wherein the retainer comprises
   an annular piece of a retainer material having the polytetrafluoroethylene retainer outer surface.

18. The mechanical device of claim 15, wherein the retainer comprises
   an annular piece of a retainer material having the polytetrafluoroethylene retainer outer surface and a central cavity, and
   a metallic filler wire within the central cavity.

19. The mechanical device of claim 15, wherein the retainer comprises
   an annular piece of a retainer material having the polytetrafluoroethylene retainer outer surface and a central cavity, and
   a metallic filler wire within the central cavity, wherein the metallic filler wire is a multistrand filler wire.

20. The mechanical device of claim 15, wherein the female component has an internal-surface cylindrical diameter of the internal surface that is greater than an external-surface cylindrical diameter of the external surface of the male component by a clearance of from about 0.03 to about 0.05 millimeters.

* * * * *